(12) United States Patent
Viswanathan et al.

(10) Patent No.: US 10,129,799 B2
(45) Date of Patent: Nov. 13, 2018

(54) MOBILITY MANAGEMENT FOR WIRELESS NETWORKS

(71) Applicant: Alcatel-Lucent USA Inc., Murray Hill, NJ (US)

(72) Inventors: Harish Viswanathan, Morristown, NJ (US); Colin L. Kahn, Morris Plains, NJ (US)

(73) Assignee: Alcatel Lucent, Murray Hill, NJ (US)

(*) Notice: Subject to any disclaimer, the term of this patent is extended or adjusted under 35 U.S.C. 154(b) by 265 days.

(21) Appl. No.: 14/531,529

(22) Filed: Nov. 3, 2014

(65) Prior Publication Data
US 2016/0127958 A1 May 5, 2016

(51) Int. Cl.
*H04W 36/32* (2009.01)
*H04W 36/00* (2009.01)
*H04L 29/12* (2006.01)
*H04W 48/16* (2009.01)
*H04W 8/06* (2009.01)
*H04W 92/10* (2009.01)
*H04W 8/18* (2009.01)

(52) U.S. Cl.
CPC ......... *H04W 36/0088* (2013.01); *H04L 61/20* (2013.01); *H04W 8/06* (2013.01); *H04W 36/32* (2013.01); *H04W 48/16* (2013.01); *H04W 8/18* (2013.01); *H04W 92/10* (2013.01)

(58) Field of Classification Search
CPC ................................ H04W 36/32; H04W 8/06
See application file for complete search history.

(56) References Cited

U.S. PATENT DOCUMENTS

| 9,282,529 B1* | 3/2016 | Jintaseranee | H04W 64/00 |
| 2010/0099393 A1* | 4/2010 | Brisebois | H04M 15/00 |
| | | | 455/418 |
| 2013/0084873 A1* | 4/2013 | Sharony | H04W 36/14 |
| | | | 455/438 |

(Continued)

FOREIGN PATENT DOCUMENTS

| JP | 2006505163 A | 2/2006 |
| JP | 2013115809 A | 6/2013 |

(Continued)

OTHER PUBLICATIONS

English Translation of Japanese Office Action; Application 2017-542818; dated Jun. 30, 2018.

*Primary Examiner* — Sulaiman Nooristany
(74) *Attorney, Agent, or Firm* — Duft & Bornsen, PC (57) ABSTRACT

Systems and methods for mobility management in wireless networks. One method includes identifying a mobility profile for a wireless device, selecting a first active mobility setting and a first idle mobility setting from the mobility profile, and determining instructions for network elements to engage in mobility management for a wireless device in an active state. The method also includes determining instructions for network elements to engage in mobility management for the wireless device in an idle state. Further, the method includes providing instructions to network elements in accordance with the first active mobility setting when the wireless device is in the active state, and providing instructions to network elements in accordance with the first idle mobility setting when the wireless device is in the idle state.

20 Claims, 7 Drawing Sheets

(56) References Cited

U.S. PATENT DOCUMENTS

| | | | |
|---|---|---|---|
| 2014/0185435 A1 | 7/2014 | Park et al. | |
| 2014/0222954 A1* | 8/2014 | Vaccari | H04L 67/26 |
| | | | 709/217 |
| 2016/0227385 A1* | 8/2016 | Ahmad | H04L 65/4061 |
| 2016/0227471 A1* | 8/2016 | De Foy | H04W 4/001 |
| 2016/0286451 A1* | 9/2016 | Ahmad | H04W 36/12 |

FOREIGN PATENT DOCUMENTS

| | | |
|---|---|---|
| WO | 2013112943 A1 | 8/2013 |
| WO | 2013167800 A1 | 11/2013 |
| WO | 2014037042 A1 | 3/2014 |

\* cited by examiner

| ACTIVE MOBILITY SETTING | DESCRIPTION |
|---|---|
| NO ACTIVE MOBILITY | NO MOBILITY |
| LIMITED ACTIVE MOBILITY | SEAMLESS MOBILITY WITHIN A LIMITED AREA |
| HIGH ACTIVE MOBILITY | SEAMLESS MOBILITY OVER A LARGE AREA |
| IDLE MOBILITY SETTING | DESCRIPTION |
| NO IDLE MOBILITY | DEVICE IS NOT TRACKED WHEN NOT TRANSMITTING DATA |
| IDLE MOBILITY - TRIGGER ONLY | DEVICE IS TRACKED WHILE WITHIN THE NETWORK SO THAT IT IS REACHABLE VIA A TRIGGERING API |
| IDLE MOBILITY - RETAIN IP | DEVICE IS TRACKED WHILE WITHIN THE NETWORK SO THAT IT IS REACHABLE VIA THE IP ADDRESS PREVIOUSLY ASSIGNED TO THE DEVICE |

FIG. 5

| DEVICE | APPLICATION | IDLE MOBILITY SETTING | ACTIVE MOBILITY SETTING | BENEFIT |
|---|---|---|---|---|
| SMART PHONE | VOIP | IDLE MOBILITY - RETAIN IP | HIGH ACTIVE MOBILITY | RECEIVE INCOMING CALLS ANYWHERE AT ANY TIME |
| | ONLINE GAMING | | | NO INTERRUPTION OR LATENCY INCREASES DURING HANDOFFS |
| | MESSAGING | | NO ACTIVE MOBILITY | EASILY SWITCH ACROSS MULTIPLE RADIO ACCESS TECHNOLOGIES |
| | HTTP ADAPTIVE STREAMING | | | ENABELS LOCAL CACHE NODES |
| SMART METER | UPLOAD METER DATA | IDLE MOBILITY - TRIGGER ONLY | NO ACTIVE MOBILITY | DEVICE CAN BE TRIGGERED THROUGH AN API CALL FOR A DM CLIENT TO ESTABLISH A SESSION WITH THE SERVER |
| | DEVICE MANAGEMENT | | | DATA CAN BE ROUTED THROUGH THE NEAREST BORDER GATEWAY |
| PET TRACKING DEVICE | UPLOAD LOCATION | NO IDLE MOBILITY | NO ACTIVE MOBILITY | NO STATE IN ANY DATA PATH ELEMENT IN THE NETWORK |
| | | | | SHORTEST PATH ROUTING TO BORDER GATEWAY |

MOBILITY MANAGEMENT FOR WIRELESS NETWORKS

FIELD OF THE INVENTION

The invention relates to the field of telecommunications.

BACKGROUND

Wireless networks provide voice and/or data services to User Equipment (UE) such as smartphones, laptops, tablets, and smart watches. Wireless networks may also provide what are known as mobility management services. Mobility management services are used to track/manage a connection between UE and the network as the UE moves across the network. For example, as a UE travels across a city, it may attach to a first base station to initiate a data session, and the network may handover the session to a second base station as the UE moves out of range of the first base station.

Mobility management settings are presently implemented on a network-wide basis. For example, in 4G Long Term Evolution (LTE) networks, if a UE is in an active Radio Resource Control (RRC) state for communicating with a base station, then a General Packet Radio Service (GPRS) Tunneling Protocol (GTP) is used to establish a GTP tunnel between the base station and a mobility anchor node, such as a Serving Gateway (SGW). A GTP tunnel is also established between the SGW and an Internet Protocol (IP) anchor node, such as a Packet Data Network (PDN) Gateway (PGW). Whenever the active UE attaches to a new base station, a GTP tunnel is established between the SGW and the new base station in order to preserve an IP address for the UE. However, GTP tunneling is associated with a substantial overhead burden, and GTP tunneling encapsulation and de-encapsulation may only be performed by specific types of router nodes in the network.

Alternatively, if UE is in an idle RRC state, LTE networks use mobility management services to track the UE differently. Specifically, the core network divides the Radio Access Network (RAN) into Tracking Areas (TAs) that each include a set of geographically proximate base stations. If the idle UE crosses the boundary between one TA and another, this change is reported to the core network. If an active connection with the idle UE is then desired (e.g., in order to transmit a packet of data to the UE), the core network triggers a broadcast (page) message using knowledge of the TA where the UE resides to track down the idle UE.

SUMMARY

Embodiments described herein provide for telecommunication networks that dynamically address the mobility needs of individual wireless devices. By programming elements of the network to address mobility management for wireless devices (and/or their applications) on an individual basis instead of a global basis, the network enhances both its efficiency and efficacy in serving customers. This means that changes in location for different applications and wireless devices may be handled using different techniques. For example, the network may forego tunneling and assign a local IP address for a device that is primarily stationary or nomadic. This helps to conserve network resources in situations where tunneling is neither necessary nor beneficial, while still preserving tunneling for other wireless devices or applications that may benefit from it.

One embodiment is a method for mobility management in a wireless network. The method includes identifying, at a telecommunication network, a mobility profile that includes at least one active mobility setting and at least one idle mobility setting for a wireless device, selecting a first active mobility setting and a first idle mobility setting from the mobility profile, and determining, based on the first active mobility setting, a first set of instructions for a first one or more network elements to engage in mobility management for the wireless device while the wireless device is in an active state exchanging packets of data with a Packet Data Network (PDN) via the telecommunication network. The method also includes determining, based on the first idle mobility setting, a second set of instructions for a second one or more network elements to engage in mobility management for the wireless device while the wireless device is in an idle state not exchanging packets of data with the PDN via the telecommunication network. Further, the method includes providing the first set of instructions to the first one or more network elements in accordance with the first active mobility setting when the wireless device is in the active state, and providing the second set of instructions to the second one or more network elements in accordance with the first idle mobility setting when the wireless device is in the idle state.

In a further embodiment, selecting the first active mobility setting and the first idle mobility setting from the mobility profile is based on a device type of the wireless device or an application identifier of an application on the wireless device.

In a further embodiment, the mobility profile includes a plurality of active mobility settings with respective ones of the plurality of active mobility settings corresponding with respective applications of the wireless device. Selecting the first active mobility setting includes selecting as the first active mobility setting a one of the plurality of active mobility settings that corresponds with a first application. Providing the first set of instructions to the first one or more network elements of the telecommunication network is based on the first active mobility setting for the first application.

In a further embodiment, the method also includes determining a change in state of the wireless device to the active state or the idle state, providing a set of instructions to a set of network elements in accordance with the first active mobility setting when the change is to the active state, and providing a set of instructions to a set of network elements in accordance with the first idle mobility setting when the change is to the idle state.

In a further embodiment, selecting the first active mobility setting is based on context information selected from the group consisting of: an operator policy that is defined for the telecommunication network and associated with the wireless device, subscriber analytics for the telecommunication network that indicate the behavior of the wireless device, and network analytics for the telecommunication network that indicate a level of traffic at the telecommunication network.

In a further embodiment, the mobility profile is identified in a connection request received from the wireless device.

In a further embodiment, the first idle mobility setting indicates that a location of the wireless device should not be tracked by the telecommunication network while the wireless device is not transmitting data.

In a further embodiment, the first active mobility setting indicates that the telecommunication network set up a tunnel to provide Internet Protocol (IP) session continuity when the wireless device moves to a new base station while exchanging packets of data with the PDN.

In a further embodiment, the first active mobility setting indicates that the tunnel cover a limited geographic area of the telecommunication network.

In a further embodiment, the first active mobility setting indicates that the telecommunication network not set up a tunnel to provide Internet Protocol (IP) session continuity when the wireless device moves to a new base station while exchanging packets of data with the PDN.

In a further embodiment, the first idle mobility setting indicates whether to retain, while the UE is not exchanging packets with the PDN, an Internet Protocol (IP) address for the wireless device that was assigned while the wireless device was exchanging packets of data with the PDN.

In a further embodiment, programming the telecommunication network based on the first active mobility setting includes selecting a programmable network element as an Internet Protocol (IP) anchor for the wireless device.

In a further embodiment, programming the telecommunication network based on the first active mobility setting includes selecting a network element to serve as a mobility anchor for the wireless device.

Another embodiment is an apparatus that includes an interface and a controller. The interface is able to obtain a connection request identifying a mobility profile that includes at least one active mobility setting and at least one idle mobility setting for a wireless device. The controller is able to determine a first active mobility setting and a first idle mobility setting from the mobility profile, to determine based on the first active mobility setting a first set of instructions for a first one or more network elements to engage in mobility management for the wireless device while the wireless device is in an active state exchanging packets of data with a Packet Data Network (PDN) via the telecommunication network, and to determine based on the first idle mobility setting a second set of instructions for a second one or more network elements to engage in mobility management for the wireless device while the wireless device is in an idle state not exchanging packets of data with the PDN via the telecommunication network. The controller is also able to provide the first set of instructions to the first one or more network elements in accordance with the selected active mobility setting if the wireless device is in the active state, and to provide the second set of instructions to the second one or more network elements in accordance with the selected idle mobility setting if the wireless device is in the idle state.

Another embodiment is a non-transitory computer readable medium embodying programmed instructions which, when executed by a processor, are operable for performing a method. The method includes identifying, at a telecommunication network, a mobility profile that includes at least one active mobility setting and at least one idle mobility setting for a wireless device, selecting a first active mobility setting and a first idle mobility setting from the mobility profile, and determining, based on the first active mobility setting, a first set of instructions for a first one or more network elements to engage in mobility management for the wireless device while the wireless device is in an active state exchanging packets of data with a Packet Data Network (PDN) via the telecommunication network. The method also includes determining, based on the first idle mobility setting, a second set of instructions for a second one or more network elements to engage in mobility management for the wireless device while the wireless device is in an idle state not exchanging packets of data with the PDN via the telecommunication network. Further, the method includes providing the first set of instructions to the first one or more network elements in accordance with the first active mobility setting when the wireless device is in the active state, and providing the second set of instructions to the second one or more network elements in accordance with the first idle mobility setting when the wireless device is in the idle state.

Other exemplary embodiments (e.g., methods and computer-readable media relating to the foregoing embodiments) may be described below.

DESCRIPTION OF THE DRAWINGS

Some embodiments of the invention are now described, by way of example only, and with reference to the accompanying drawings. The same reference number represents the same element or the same type of element on all drawings.

DETAILED DESCRIPTION

The figures and the following description illustrate specific exemplary embodiments of the invention. It will thus be appreciated that those skilled in the art will be able to devise various arrangements that, although not explicitly described or shown herein, embody the principles of the invention and are included within the scope of the invention. Furthermore, any examples described herein are intended to aid in understanding the principles of the invention, and are to be construed as being without limitation to such specifically recited examples and conditions. As a result, the invention is not limited to the specific embodiments or examples described below, but by the claims and their equivalents.

Figure 1:
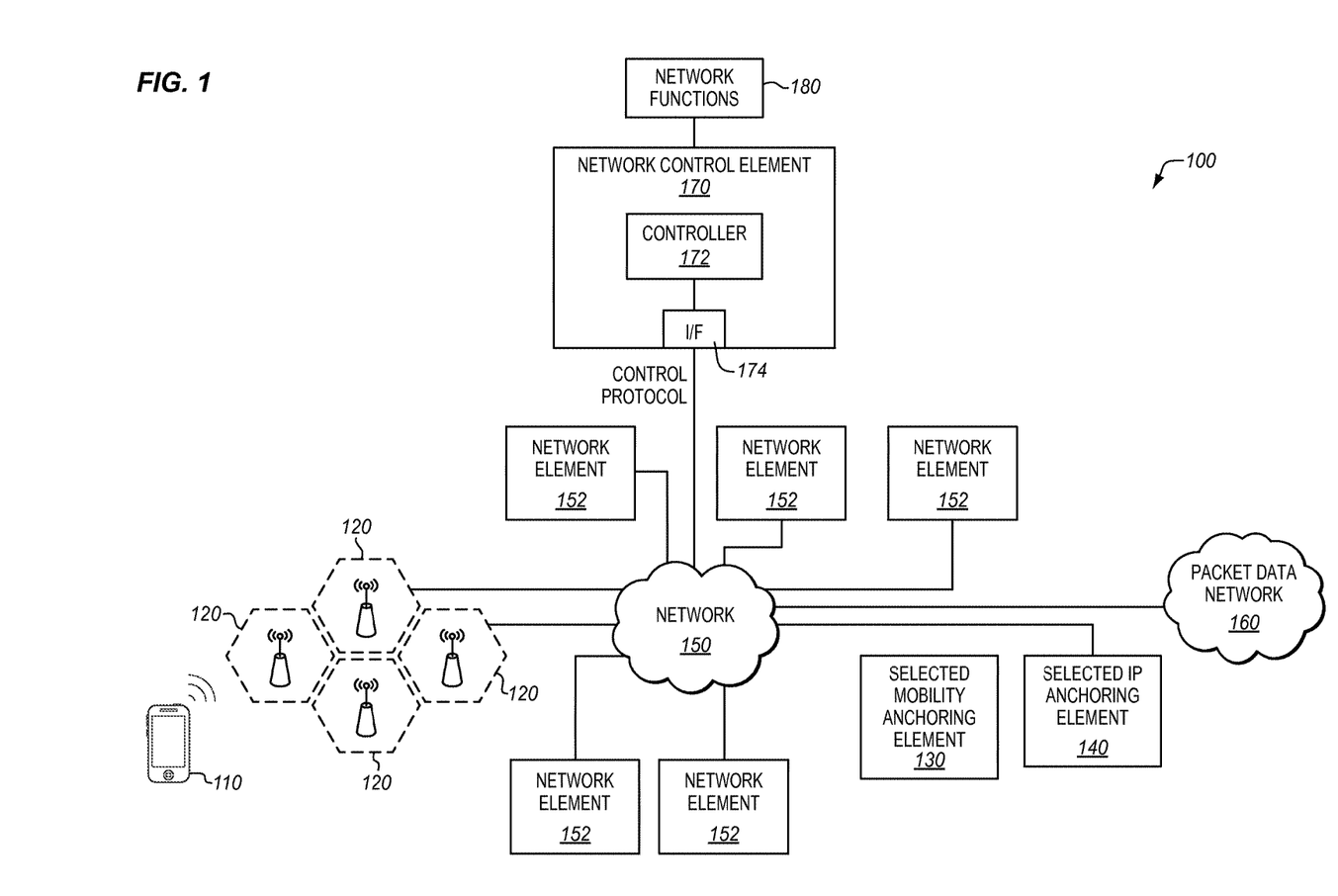
FIG. 1 is a block diagram of a telecommunication (telecom) system in an exemplary embodiment.

FIG. 1 is a block diagram of a telecommunication (telecom) network 100 in an exemplary embodiment. Network 100 comprises any system operable to exchange data with wireless device 110 in order to provide voice and/or data services to wireless device 110. Network 100 has been enhanced so that its various network elements (which may normally operate as switches/routers) are programmed dynamically in accordance with mobility profiles for individual wireless devices (e.g., smart phones, tablets, smart thermostats, etc.). For example, network control element 170 may provide instructions to (e.g., program) one or more network elements 152 to act as mobility and IP anchors for specific wireless devices.

In this embodiment, telecom network 100 utilizes multiple network elements to exchange data between wireless device 110 and PDN 160. Specifically, wireless device 110 attaches to one of base stations 120 via a Radio Access Network (RAN) protocol in order to establish an air interface connection. The base station 120 that wireless device 110 is attached to then communicates with other network elements, as determined by network control element 170, to establish a bearer that carries communications from the base station 120 to PDN 160.

Network control element 170 is capable of providing instructions to the elements of network 100 to apply mobility settings from a mobility profile. Thus, in order to properly establish and maintain a bearer, network control element 170 (and more specifically controller 172) may, according to the settings for a mobility profile, operator policy for the network, subscriber analytics for the subscriber, and/or network analytics for the network, program a Mobility Management Network Function (MMNF) of network functions 180 to track the base station 120 to which wireless device 110 is currently anchored. For example, the MMNF may further store and process state information associated with the mobility profile and settings provided by the control element 170. If an idle mobility setting specifies idle-mode mobility for wireless device 110, then controller 172 may assign a network element to serve as a selected Mobility Anchoring Element 130 for wireless device 110 and instruct the MMNF to track an area comprising several base stations 120 in which the wireless device 110 moves. When selected to perform the duties of a mobility anchoring element 130, the network element buffers packets arriving from PDN 160 for wireless device 110 while the wireless device 110 is located by the MMNF. Meanwhile, if an active mobility setting specifies active-mode mobility for an application, a selected Internet Protocol (IP) anchoring element 140, assigned by controller 172, terminates tunnels for IP connections between wireless device 110 and applications in PDN 160.

The types of data exchanges described above, where air interfaces and bearers are established/reserved for wireless device 110 in order to exchange data with a PDN, are referred to as "sessions," and are utilized by wireless device 110 while it is in the active state.

PDN 160 may comprise the Internet, a proprietary enterprise network, etc. and the like. Network 100 further includes multiple network elements 152 that may be programmed by network control element 170, and an interconnection network 150 that provides communication channels between the various network elements described above.

In this embodiment, network control element 170 utilizes a hardware controller 172 (e.g., a processor and memory) and interface 174 (e.g., an Ethernet connection) to implement multiple functional modules. For example, a network policy module may apply network rules/policies to the wireless devices of network 100, a wireless network module may program air-interface logic for base stations 120, a network analytics module may track network load and resource usage, and a Software Defined Networking (SDN) module may program paths between switching elements of telecom network 100.

Network control element 170 is capable of communicating with and/or accepting instructions from network functions 180 (e.g., functions such as mobility management, security, Quality of Service (QoS), network control and monitoring, optimization, etc.) implemented in the network. When network control element 170 programs network functions 180, network control element 170 may do so based on whether or not mobility and IP anchors should be selected for wireless device 110, based on whether IP addresses of wireless device 110 are preserved when wireless device 110 moves between base stations 120 while in the active state, etc. and the like.

Wireless device 110 is in the active state when it is actively communicating with applications to exchange packets of data (e.g., application layer packets) via PDN 160 whereas wireless device 110 is in an idle state when no packets are being exchanged between the device and applications on PDN 160 (i.e., when wireless device 110 is not involved in communications with external devices). This means that wireless device 110 may continue to perform some signaling in the idle state, but this signaling is not related to application layer content. While in the idle state, wireless device 110 may enter a power saving mode whereby a mobility management network function 180 may only track the location of the device 110 to a granularity consisting of many base stations 120 (e.g., a tracking area or the like). In a 4G network, the "active" state may correspond with an active RRC state, and the "idle" state may correspond with an idle RRC state.

As used herein, "applications" utilize the application layer of the Open Systems Interconnect (OSI) model, and do not alter the behavior of other layers of network 100 such as the transport layer, network layer, data link layer, or physical layer.

Further details of the operation of network 100 will be discussed with regard to FIGS. 2-3. Assume, for this embodiment, that wireless device 110 has just powered on within the range of a base station 120 of telecom network 100.

Figure 2:
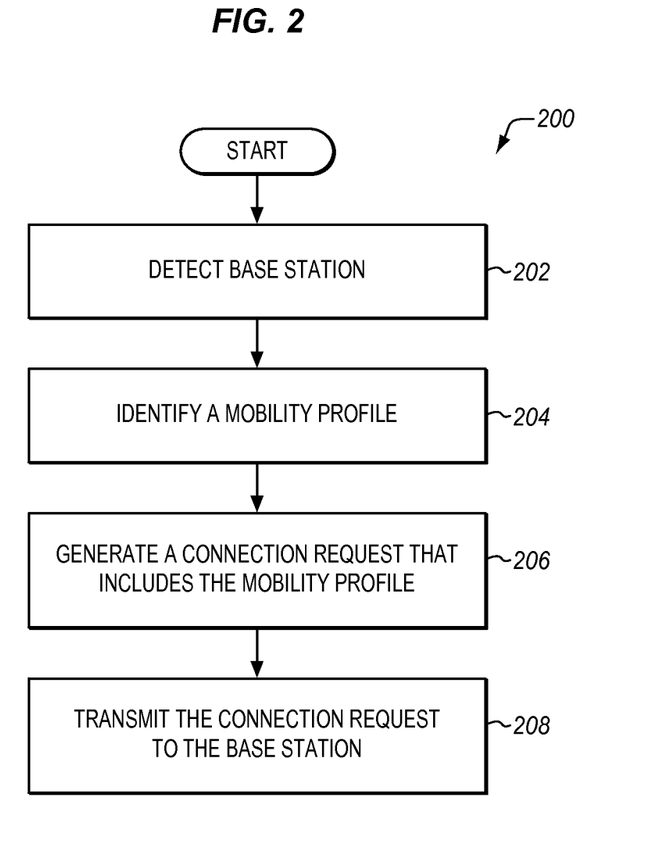
FIG. 2 is a flowchart illustrating a method for transmitting mobility profiles for a wireless device in an exemplary embodiment.

FIG. 2 is a flowchart illustrating a method 200 for transmitting mobility profiles for wireless device 110 in an exemplary embodiment. The steps of methods 200-300 are described with reference to network 100 of FIG. 1, but those skilled in the art will appreciate that methods 200-300 may be performed in other communication networks. The steps of the flowcharts described herein are not all inclusive and may include other steps not shown. The steps described herein may also be performed in an alternative order. FIG. 2 is provided as an example illustrating one embodiment of how a mobility profile could be indicated to a network control element.

In step 202, a controller of wireless device 110 detects a base station 120. For example, the controller may operate a transceiver to detect a periodically transmitted message from base station 120 that identifies base station 120.

Once base station 120 has been detected, wireless device 110 knows that network 100 is available to connect with. Thus, the controller of wireless device 110 determines what mobility settings it desires to be used when communicating with network 100. To this end, the controller of wireless device 110 identifies a mobility profile indicating how the network may perform mobility management for wireless device 110 (step 204). These settings may be defined, for example, on an application-by-application basis, based on the capabilities of wireless device 110, etc. and the like.

In step 206, the controller of wireless device 110 generates a connection request (or other signaling message) for the base station 120 that was detected in step 202. The controller inserts/includes the mobility profile within the connection request (e.g., attach request) in order to inform the network how mobility may be handled. For example, the connection request may explicitly list a preferred mobility setting for wireless device 110 (or an application thereof). In one embodiment, the request includes a mobility profile that explicitly lists multiple desired mobility settings.

In step 208, the controller of wireless device 110 operates a transceiver to transmit the connection request to the base station 120. After the connection request has been transmitted, wireless device 110 awaits a response from the corresponding base station 120 in order to receive the selected mobility option from network 100.

Figure 3:
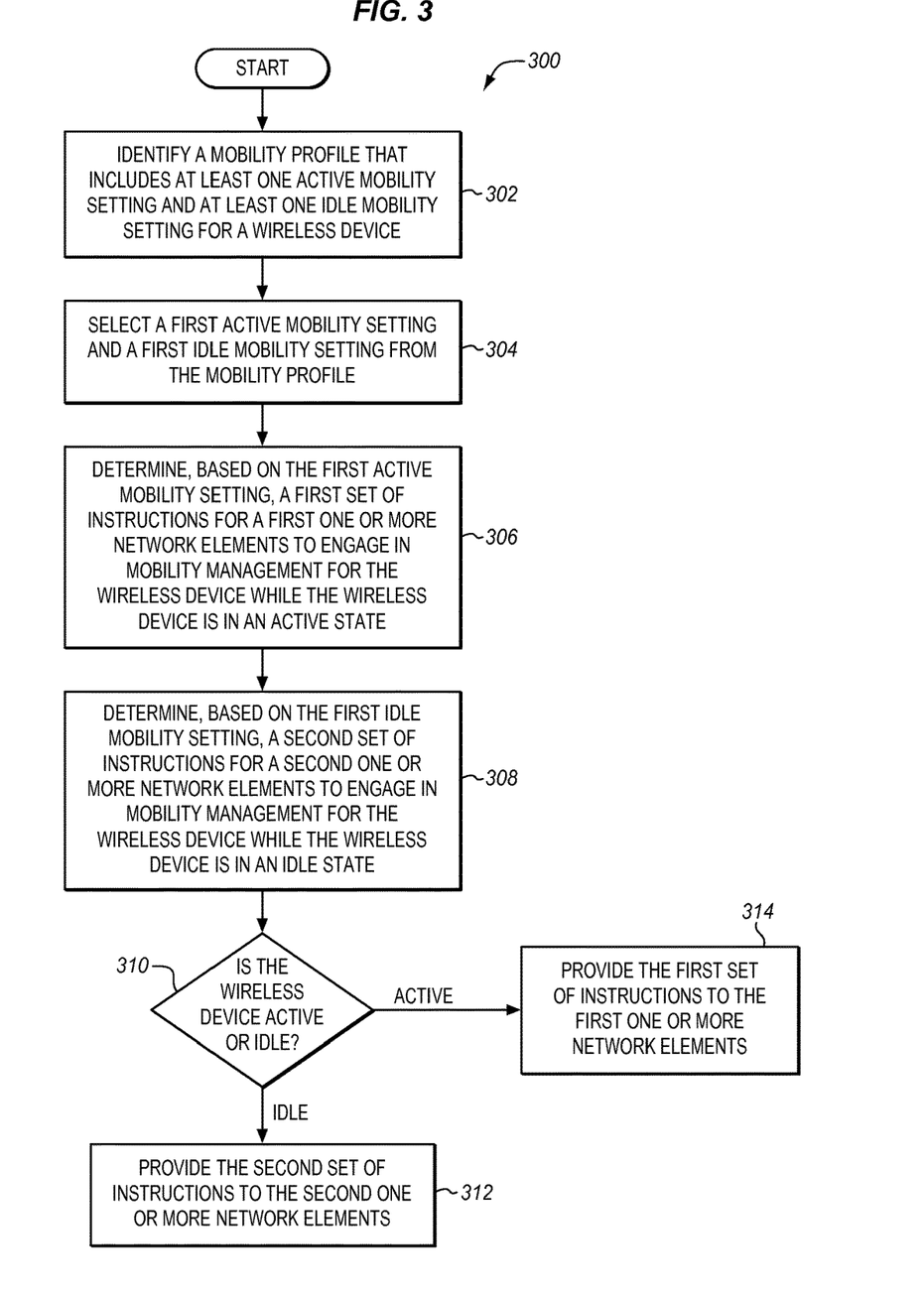
FIG. 3 is a flowchart illustrating a method for utilizing mobility profiles for a wireless device in an exemplary embodiment.

FIG. 3 is a flowchart illustrating a method 300 for utilizing mobility profiles for wireless devices in an exemplary embodiment. Method 300 may be performed while wireless device 110 is waiting for a response to the connection request, and may be triggered in response to a base station 120 forwarding all or part of a connection request to network control element 170. In further embodiments, method 300 may be internally triggered by network control element 170 in response to changes in network 100.

In step 302, network control element 170 identifies a mobility profile that includes at least one active mobility setting, and at least one idle mobility setting for a wireless device. In one embodiment, the mobility profile is included with or identified by a connection request sent from wireless device 110 and received at interface 174. Network control element 170 may receive the connection request either directly from base station 120, or via an intervening element of network 100. In a further embodiment, the mobility profile is identified by detecting an event on network 100, and selecting a mobility profile stored in memory that is associated with the event.

In step 304, controller 172 selects a first active mobility setting and a first idle mobility setting from the identified mobility profile. The selection process is not limited to selecting/activating just one active mobility setting, but rather may include selecting multiple mobility settings desired for complying with the mobility profile. Selection of the active and idle mobility settings may be based on a variety of factors. For example, the settings selected may depend upon which application(s) are currently active on wireless device 110 (as indicated by one or more application identifiers), an operator policy that is defined for the network and associated with a subscriber for wireless device 110, subscriber analytics for the network that indicate the behavior of a subscriber for wireless device 110, a device type for wireless device 110, network analytics for the network that indicate a level of traffic at the network, etc. and the like.

In step 306, controller 172 determines, based on the first active mobility setting, a first set of instructions for a first one or more network elements to engage in mobility management while wireless device 110 is in an active state exchanging packets of data with PDN 160. For example, controller 172 may determine how to program network elements. This may include deciding whether to program one or more network elements 152 to operate as mobility and/or IP anchors for wireless device 110, selecting network elements 152 to serve in those roles, and other mobility settings that are relevant to servicing data traffic between wireless device 110 and PDN 160. In step 308, controller 172 determines, based on the first idle mobility setting, a second set of instructions for a second one or more network elements to engage in mobility management for the wireless device while wireless device 110 is in an idle state not exchanging packets of data with PDN 160.

At this point, and iteratively in the future as communications change between wireless device 110 and PDN 160, controller 172 determines in step 310 whether or not wireless device 110 is presently in the active state or the idle state. When wireless device 110 is in the active state, in step 314 controller 172 provides the first set of instructions to the first one or more network elements in accordance with the first active mobility setting. This may include programming network elements in accordance with the active mobility setting. When wireless device 110 is in the idle state, in step 312 controller 172 provides the second set of instructions to the second one or more network elements in accordance with the first idle mobility setting. In one embodiment, providing instructions to network elements includes selecting a base station or upstream anchor router node that will assign an IP address to wireless device 110 (e.g., using an appropriate mechanism such as Dynamic Host Configuration Protocol (DHCP)). Programming the network elements may include operations for implementing a selected mobility setting, and these operations may be based, for example, on the operator policies, subscriber analytics, and network analytics discussed above.

When used in this manner, method 300 provides a benefit over prior systems in that they allow individual wireless devices (including, for example, individual applications of a wireless device) to dynamically reduce their footprint in terms of network resources. This enhances the amount of available resources at network 100, without unduly hampering the services that network 100 provides. In a further embodiment, mobility settings may be associated with applications (or entire groups of applications) of wireless device 110, and controller 172 may select and/or program the network elements to comply with multiple mobility settings (e.g., one or more settings for each application of wireless device 110).

Example Mobility Settings and Profiles

Figure 4:
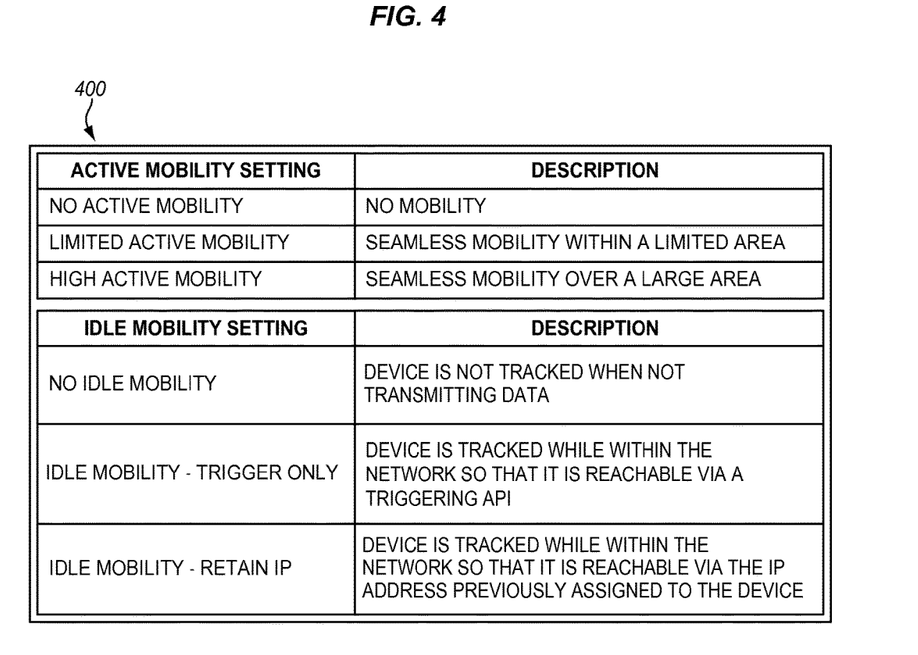
FIG. 4 is a table illustrating mobility instructions in an exemplary embodiment.

FIG. 4 is a table 400 illustrating mobility settings in an exemplary embodiment. According to FIG. 4, mobility settings are grouped into active and idle mobility settings. In this embodiment, active state mobility settings include "No Active Mobility," "Limited Active Mobility," and "High Active Mobility," and idle mobility settings include "No Idle Mobility," and "Idle Mobility."

According to FIG. 4, a mobility setting for an application or device that is active may be "No Active Mobility," "Limited Active Mobility," or "High Active Mobility." "No Active Mobility" is used for static devices, or when there are no applications being operated by the device that require seamless mobility (e.g., via GTP tunneling). "Limited active Mobility" indicates seamless mobility (and therefore GTP tunneling) within a limited geographic area (e.g., one square mile, a city, etc.) serviced by a known group of base stations, and "High Active Mobility" indicates seamless mobility over a wide area, such as when the device is located in a moving car.

According to FIG. 4, a mobility setting for a device in an idle state may be "No Idle Mobility" or "Idle Mobility." A "No Idle Mobility" setting means that a device is not tracked by the network when the device is not transmitting data. The "No Idle Mobility" setting is appropriate for devices that are stationary, for devices that are always active and hence have no need for an idle state mobility management scheme, and for devices that do not have a need to be reached from the network. For example, if communication is always triggered/initiated from the device, then there is no need for the network to track the device while in its idle state. An "Idle Mobility" setting means that the device will tracked by the network when it is idle, meaning that the device is reachable via either a triggering Application Programming Interface (API) or through the IP address that was previously assigned to the device. The "Idle Mobility—Trigger Only" setting refers to keeping the device reachable via an API, and the "Idle Mobility—Retain IP" setting refers to keeping the device reachable via an IP address. A triggering API call may be available even for a device that requires retaining its IP address in the idle state. Furthermore, since multiple IP addresses may be assigned to a device (e.g., one for each active application), multiple IP addresses may be retained in the network in the case of an "Idle Mobility—Retain IP" setting for a device.

Several factors affect how mobility settings are used for devices/applications. The active state mobility setting determines whether IP addresses are preserved as the device moves, and hence determines whether tunneling will be used. This impacts which node in the network will serve as the mobility anchor and the IP anchor (which is where the tunnels from base stations are terminated). A "No Active Mobility" setting means that no IP address preservation or tunneling is used. A "Limited Active Mobility" setting means that the device is expected to move across a small set of base stations and thus the mobility and IP anchor may be a local router. That is, tunneling may not be needed if all the base stations within the mobility area are interconnected by a Layer 2 network such as an Ethernet. A "High Active Mobility" setting means that the device will move over a wide area, and hence a mobility and IP anchor in a core network should be assigned.

In one embodiment, the mobility profile includes two sub-profiles, one corresponding to the active state and one corresponding to the idle state. The active state mobility profile applies when the device is in an active state, (i.e., actively exchanging packetized data with an application), while the idle state mobility profile applies when the device is idle (that is, when no applications on the device are actively exchanging data with a PDN). In one embodiment, the idle state profile includes just one setting that applies to the device as a whole, whereas the active state profile may include settings for both the device and one or more applications in the device. Individual mobility settings may be determined for a device as a whole and/or for a specific application (or class of applications) within the device. For example, mobility settings could be "No Active Mobility" for all applications on a device except for conversational applications such as voice. Thus, different application categories within a device may use different active mobility settings within the mobility profile for the device.

The active state profile and idle state profile may be independently defined. For example, if a wireless device is stationary and does not need to be reachable from the network, idle mode mobility setting of "No Idle Mobility" may be used, but when an application becomes active on the wireless device, a "High" or "Limited" active mobility management scheme may be desired to provide seamless service to the wireless device. Similarly, a mobile Machine to Machine (M2M) device may request a level of idle mobility to make it reachable from the network and to save battery power, but may elect not to request active mobility if its application flows are insensitive to momentary link disruptions. Lastly, for a wireless device that is less sensitive to power consumption, it may be desirable to always keep the device active.

Figure 5:
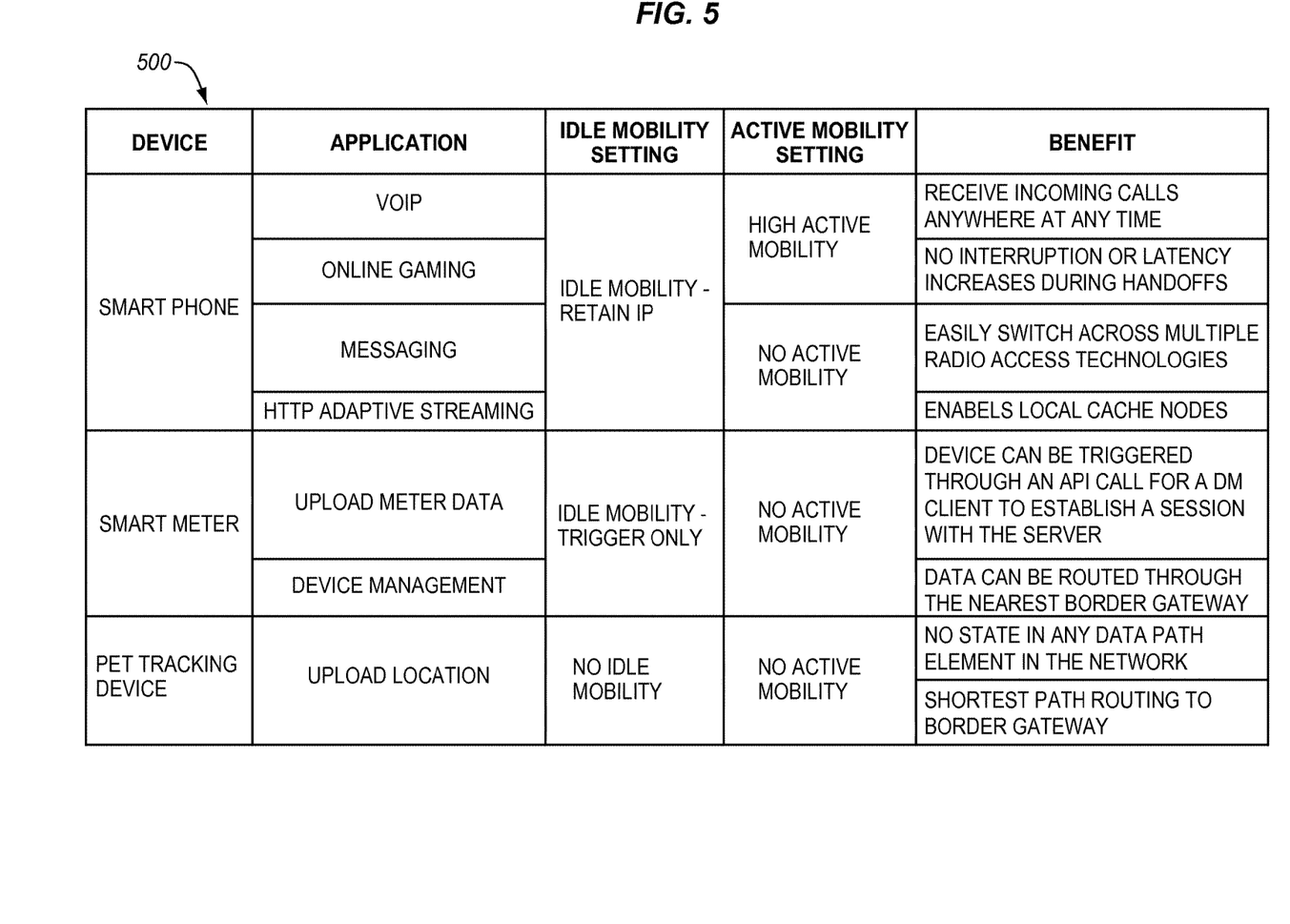
FIG. 5 is a table illustrating mobility profiles applied to a wireless device in an exemplary embodiment.

FIG. 5 is a table 500 illustrating mobility profiles applied to wireless devices in an exemplary embodiment. According to FIG. 5, each wireless device is associated with a mobility profile that includes at least one idle mobility profile, and at least one active mobility profile. The active mobility profile includes multiple active mobility settings, indexed by the application (or application category) that they apply to. For example, a Voice over Internet Protocol (VOIP) application for a smartphone may have an active mobility setting of "High Active Mobility," while a gaming application for the same smartphone may have an active mobility setting of "no active mobility."

In a further embodiment, network control element 170 actively changes mobility settings for a device and/or application based on the behavior of the device and/or application with respect to the network. Thus, if an idle device that generally remains static starts to move and is utilizing an application that requires seamless mobility, then network control element 170 dynamically reprograms elements of network 100 in order to initiate "Idle Mobility" and begin tracking the location of the device. If the device moves to the active state, then network control element 170 dynamically initiates "High Active Mobility," assigns an IP anchor to the device, and initiates tunneling of packets for the application used by the device. Similarly, if there are no data flows from an active device for a certain period of time, network control element 170 may release the IP anchor for the device, assign a new local IP address to the device, and set "No Active Mobility" for the active mobility setting for the device. The device may then use its new IP address when interacting with corresponding applications.

In a further example embodiment, if the idle state setting of the device is determined by network control element 170 to be "Idle Mobility," then a Mobility Management Control Application (MMCA) (one of network functions 180) is configured by network control element 170 to track the device while the device is in the idle state. This is done through periodic or location driven Tracking Area (TA) updates sent from the device. In cases where the idle mobility setting is "No Idle Mobility," then the IP address(es) assigned to the device are released when the device is idle and the device is no longer reachable from the network. Further exemplary details of mobility settings and mobility management are provided below.

Mobility Profile Determination

The mobility profile (including idle and active profiles) may be indicated either explicitly by the device when it first connects to the network or by reference to a profile maintained in the network. For example, devices may request a connection through a signaling link to network control element 170 (e.g., through a base station 120 and corresponding wireless network controller), and the request may include the mobility profile. In addition, a default mobility profile for each device may be maintained in the network (and referenced by the initial request or otherwise associated with the device, for example based on a device identifier). For example, for an M2M device such as a smart meter, the only mobility settings allowed by a mobility profile for the device could be "No Active Mobility" and "No Idle Mobility." This does not mean that the smart meter cannot move to an adjacent base station because of changing radio conditions etc., but rather means that on-going connections will be terminated when a handoff to a new base station occurs, as a new IP address may be assigned for the device at that time.

Mobility Setting Determination

Once the mobility profile has been determined, many factors may influence which mobility settings from the profile are applied to the device (and/or application thereof). Network control element 170 considers these factors, decides the applicable mobility settings and instructs the MMCA how to proceed. For example, location and time-of-day parameters may be used to select a mobility setting for the device. Thus, a smart phone that connects to the network from the home of the subscriber early in the morning or late at night could initially be assigned a "No Active Mobility" setting for active mobility since the device is not expected to move outside the home, which is typically covered by a single base station.

Additionally, historical information may be used to predict the most suitable default mobility setting from those included within a mobility profile. For example, historical information could show that a particular device always connects from a small set of base stations on all working days between 9 AM and 5 PM, presumably because the user of the device is at work in his/her office on most working days.

A specific active mobility setting may also be explicitly requested when an application is triggered. Network control element 170 then chooses to accept or deny the request based on the allowable mobility settings in the profile for the device that the application is running on.

The following description illustrates exemplary mobility management procedures that may be used for each mobility setting. These sections address the use of active mobility settings in embodiments where an initial request for connection is received from a device. The idle state mobility settings, and transitions from an idle state to an active state, are discussed after the active mobility settings.

Mobility Management for the "No Active Mobility" Setting

This section described procedures for situations where a network control and monitoring function (one of network functions 180) determines that the active mobility setting for a device/application is "No Active Mobility." In this case, network control element 170 assigns the device a globally routable IP address in the IP subnet of the base station. The address may be assigned by network control element 170 itself, or network control element 170 may direct a base station 120 (or the nearest Layer 3 router if the base station 120 is not Layer 3) to assign the IP address. Packet forwarding is then performed based on IP routing techniques (e.g., in a similar manner to IP routing on the Internet). Specifically, the base station forwards upstream packets towards the next hop router, and the border routers route downstream packets towards the base station by using the destination IP address of the device. If the device moves to a neighboring base station, that new base station sees the new flow from the device and triggers network control element 170 to provide a rule for handling the flow. Network control element 170 matches the IP five tuple of the flow to that of the flow in the previous base station, authenticates that the device is authorized, and triggers assignment of a new IP address belonging to the subnet of the new base station to be assigned to the device. When the new IP address is assigned, on-going flows are terminated and the device establishes new connections with its applications using the new IP address.

For the purposes of charging, the base stations 120 are directed by network control element 170 to meter the flows and periodically report one or more of packet count, byte count, and flow duration information to the network control element 170. For offline charging, network control element 170 generates a charging record for the flows/device and sends the record to the charging application. For online charging, the network control element 170 compares the packet/byte count against a credit control limit provided by an online charging application. Upon exceeding the limit, network control element 170 will either request for additional credit or ask the base station to drop the flows until further credit is available.

Mobility Management for the "High Active Mobility" Setting

If a network control and monitoring function determines that the device/application will use high-speed seamless mobility, then a router node that covers a larger number of base stations 120 in network 100 is chosen by network control element 170 as the mobility anchor. Network control element 170 directs this anchor router node to assign the IP address for the device from one of its domains, or network control element 170 assigns the address itself. The IP domain need not correspond to the current base station IP addresses, since packets from the device will be tunneled to the anchor node. Tunneling is established by network control element 170 to configure flow tables at the base station and the anchor router. The anchor and the tunnel are configured for the device immediately upon initial connection request. The mobility anchor may be chosen based on the domain of mobility expected for the application or device. For example, if prior history indicates that the device moves within a particular neighborhood of a city, then a router that serves the traffic for that region may be chosen as the mobility anchor for applications that require seamless mobility. Packets from the device are encapsulated at the base station using the address of the anchor as the destination and forwarded to the anchor node where the packet is de-encapsulated and forwarded toward the border routers. In the downstream direction, the packets destined for the device are routed towards the anchor since the IP address of the device is assigned from the IP domain of the anchor. At the anchor the packets are encapsulated to indicate the base station as their destination, and are then sent over the network toward the base station. At the base station the packets are de-encapsulated and sent over the air to the device.

When the active device moves from one base station to the next, an air-interface handoff is performed. The device then connects to the new base station and starts sending IP packets with the old IP address. The Layer 2/Layer 3 switch part of the new base station sends a query to the controller to determine how to treat the new flow (since there is no flow table entry corresponding to the old IP address being used by the device). This triggers network control element 170 to provide a new configuration to the anchor router to handle tunneling to the new base station and also configures the new base station switch with appropriate flow table information to encapsulate and de-encapsulate packets towards the anchor node.

In an alternate embodiment, to ensure a successful handoff, the protocol may be designed so that the handoff is triggered by the old base station sending a request to a mobility management function in order to configure the new base station. In this case, the mobility management function verifies availability of resources at the new base station and then requests that network control element 170 configure the flow table in the new base station. Network control element 170 then triggers forwarding of unsent packets from the old base station to the new base station. This process may use a specialized handoff signaling protocol between the base stations.

If the device moves outside the area served by the anchor router, then a new router further upstream may be selected as the tunnel end point. This improves the efficiency of the packet flow and prevents triangular routing scenarios from arising. In this case, flow tables entries for the flow are updated in the source and target router end points.

Mobility Management for the "Limited Active Mobility" Setting

This situation may apply when the active mobility of a device is restricted to a set of base stations that cover a limited geographic region (e.g., a city, neighborhood, building, etc.) and are inter-connected by a Local Area Network (LAN) to a gateway router. In this case, instead of establishing the gateway router node as the anchor with packets tunneled between the base station and the gateway, mobility may be handled by advertising/broadcasting for devices attached on the LAN. Such a scenario is applicable in an enterprise environment. Specifically, when a device moves from one base station to the next on the LAN, the new base station, using Address Resolution Protocol (ARP), informs the other nodes on the LAN (including the gateway node) that the device is now attached to it. This enables the gateway router to forward the packets to the correct base station in the LAN.

Mobility Management for the "No Idle Mobility" Setting

If the Idle Mobility setting (e.g., as determined by a network control and monitoring function) is "No Idle Mobility," then the device is not tracked by the network during idle periods. Packets from network based applications to the device with any previously established IP addresses will be dropped. For the device to be reachable by the network as it moves through the network, the device connects to a new base station and executes one of the procedures associated with active mobility.

Mobility Management for the "Idle Mobility" Setting

To conserve battery and reduce network signaling, wireless devices may support "Idle Mobility" settings. When a device attaches to the network, idle mobility management may be instantiated by a network control and monitoring function according to a mobility profile included in the device's request for service and/or available in a stored profile. Furthermore, the mobility profile may include an idle mobility setting that indicates the need for retaining the IP address of the device when it is in idle state, or an idle mobility setting that indicates that applications should trigger the device using a network API to establish a connection, or a mobility setting that indicates that no IP address for the device should be retained. The second scenario is referred to as "Idle Mobility—Retain IP," while the first scenario is referred to as "Idle Mobility—Trigger Only." If granted by a network control and monitoring function, instantiation of this request takes place in an MMCA which creates a session for the device. In either case, for each device that is in an idle state, the MMCA maintains a service area similar to a tracking area in LTE. Information is then tracked at the MMCA indicating the device's current service area (normally encompassing many base stations). When an idle device crosses into a new service area, it initiates an exchange with the MMCA to update the information at the MMCA. Otherwise the device is not required to exchange information with the network while idle.

Mobility Management for the "Idle Mobility—Retain IP" Setting

In this scenario, when the device initially attaches, or when it re-attaches to a new base station when its active mobility setting is "No Active Mobility," the device is assigned a global IP address from the domain of an anchor switch so that packets coming from network 100 that are addressed to the device arrive at the anchor node. In some circumstances, the base station where the device was last active is the anchor, and hence there is no tunnel from the anchor to the serving base station. When the device transitions from active to idle, an SDN module of network control element 170 instructs switches of network 100 to remove flow tables associated with device flows. When subsequently a packet arrives in the network for the device/application, it arrives at the anchor switch and the switch queries the SDN module for forwarding instructions. The SDN module may queries the MMCA, which locates the appropriate base station by broadcasting messages to page the device.

Based on the access node from which the device responds, the MMCA sends an SDN module the current device location and the location of other anchors associated with applications on the device. The SDN module then sends forwarding instructions to the switches. At this stage the device is in an intermediate "Reactivation State," and the flow tables of all anchors (e.g., including anchors that correspond to other dormant applications) are updated to route packets to the base station where the device is currently attached. No new IP addresses are assigned.

Mobility Management for the "Idle Mobility—Trigger Only" Setting

In this case, an application that attempts to reach the device invokes an API call that identifies the device to the MMCA. This may occur whenever the application does not have an active session with the device (or an application thereof) and attempts to establish a new session. In the API call, an application identifier such as the Uniform Resource Locator (URL) of the server where the device is trying to establish a session is passed to the MMCA as a parameter in the API. Upon receiving the API call from an application, the MMCA pages the device with broadcast messages across the service area, and includes the application identifier in the message. Once the device receives this message, it triggers an application client on the device in order to establish an active session with the server. When the first packet is sent from the device, a switching component of the base station has no corresponding flow filter. Hence, the base station sends a query to a SDN module of network control element 170, which in turn queries the MMCA for the mobility state to be used with the application. Upon instruction from network control element 170 to service the flow, a new IP address is assigned to the device and an active mobility setting is invoked/applied.

The advantage of the trigger only case (relative to retaining the IP address) is that it avoids the overhead associated with assigning a permanent IP address from a central anchor node. The trigger only case also provides support for dormant applications, combining mobility management with a push service similar to the Google Cloud Messaging and Apple Push Notification services.

Idle to Active Transitions

When one of the applications on the device attempts to communicate with a network side application or when a trigger is received by the MMCA, the device will transition from idle to active. When transitioning from "No Idle Mobility" or "Idle Mobility—Trigger Only" settings to an active state, any of the above active mobility procedures may be applied (including the assignment of a new IP address to the device/application) in accordance with the active mobility setting for the device/application.

When a network based application sends a packet to an idle device, the device is paged and connects with a new base station. Then, packets are sent between the mobility anchor and the base station where the device is located. When the mobility anchor is not co-located with the base station, tunnels are established by modifying flow table entries. The device is said to be in a "reactivation" state at this point. Network control element 170 updates the flow tables of any other anchor in the network (corresponding to other dormant applications) for the device so that any packets from the network for any other dormant application are routed to the device. Subsequently, when any of the applications on the device with a "No Active Mobility" setting are triggered, a new IP address is assigned locally, and appropriate procedures described above are executed in subsequent handoffs. For "High Active Mobility" and "Limited Active Mobility" settings, the IP address retained during the idle state will continue to be used and the above procedure will apply on subsequent handoffs. The device transitions from a reactivation state to an active state after it has been notified by the MMCA that all flow tables associated application anchor points have been updated by the SDN module.

In one embodiment, independent of the active mobility setting used, a tunnel is set up from the anchor to the new base station. This allows packets from the application server to be delivered to the device. This does not affect subsequent behavior which is dependent on the active mobility setting of an application. If an application has "No Active Mobility" as its active mobility setting, then the connection through the tunnel established to provide initial connectivity with the application server is later dropped. If however the application has "High Active Mobility" or "Limited Active Mobility" as its active mobility setting, then the connection through the tunnel established to provide initial connectivity with the application server is maintained when the device moves. In this case the SDN module updates the flow tables at the anchor so that packets are forwarded to the new base station.

Dynamic Modification of Mobility Settings

In further embodiments, network control element 170 is capable of altering the mobility setting and/or profile for a device/application, based on the behavior of the device/application. For example, suppose that a device initially starts operating with a "No Active Mobility" setting, and subsequently requests a "High Active Mobility" setting for a new application. There are several techniques that may be used to address this issue.

According to the first technique, if the application is already active then network control element 170 picks a suitable anchor in the network that is on the path towards the current base station and dynamically modifies the flow table in that node to activate tunneling of packets towards the current base station. For example, the anchor could be a border router through which packets were being received at the base station. At the same time, network control element 170 also updates the flow table in the base station to perform encapsulation and de-encapsulation for the flows to and from the device. Once the anchor is in place and properly configured, as the device moves, the mobility management algorithm described in previous sections is applied.

According to a second technique, if the application is already active then network control element 170 picks the current base station as the anchor. When the device moves, network control element 170 updates the flow table in the old base station so packets are forwarded to the new base station. Packets received from the new base station are de-encapsulated at the old base station and forwarded to the application server.

According to a third technique, network control element 170 directs the application to use a new IP address corresponding to an anchor in the network. The IP address may be newly assigned, or previously assigned to the device for use by other applications. The application may establish a new session with its application server, but IP session continuity is supported for subsequent handoffs.

Examples

In the following examples, additional processes, systems, and methods are described in the context of an example for a bedside sleep monitor, and an example for a mobile phone.

Bedside Sleep Monitor

Figure 6:
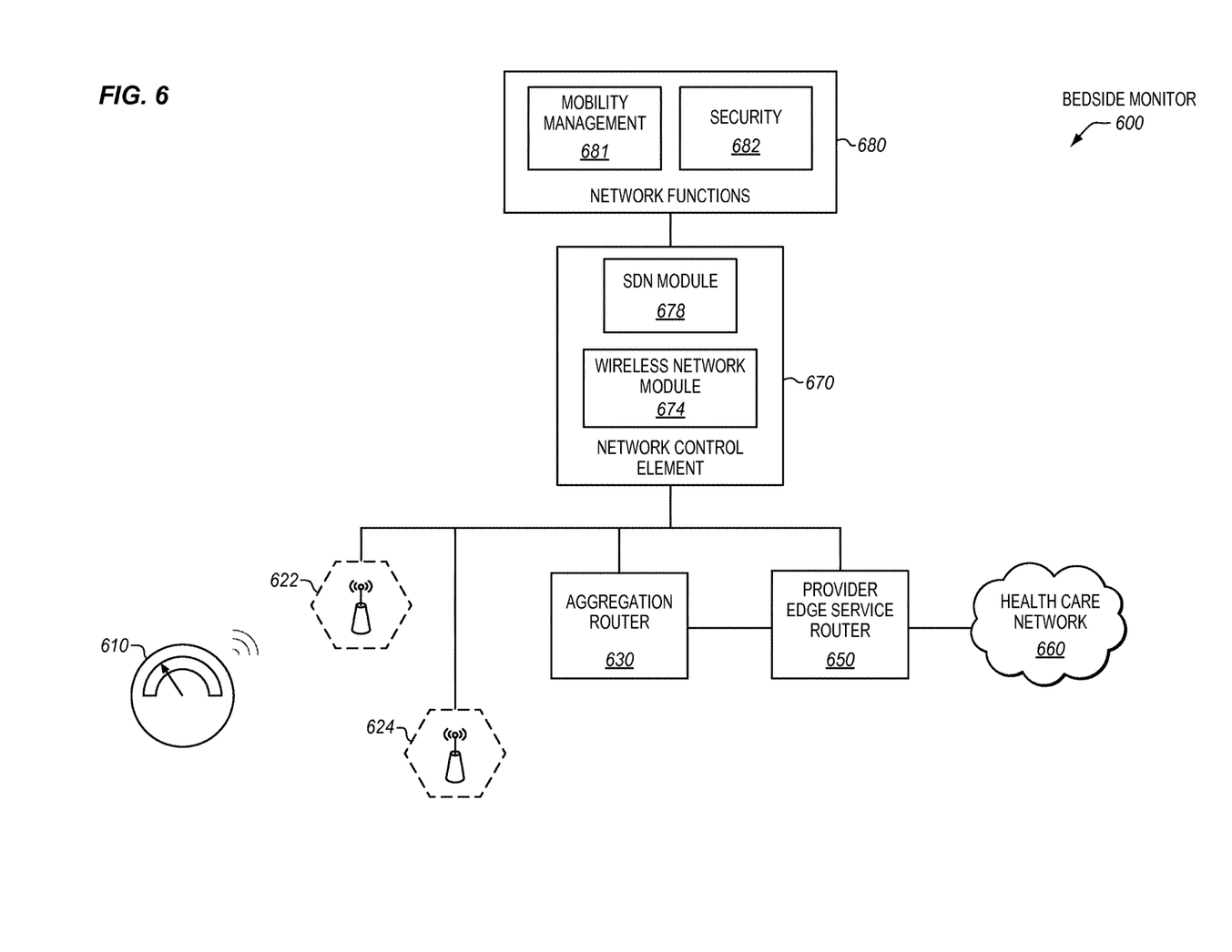
FIG. 6 is a block diagram of a telecom network that supports a health monitoring system in an exemplary embodiment.

In this example illustrated in block diagram 600 of FIG. 6, a bedside sleep monitor 610 remotely connects to a healthcare application in a hospital via a network 660. The role of the monitor is to periodically upload data to a corresponding application maintained at the hospital. In this example, monitor 610 uses Hypertext Transfer Protocol (HTTP) to perform this task. If the connection breaks during an upload of monitoring data, a new connection may be established between monitor 610 and base station 622 without substantial delay. Therefore, seamless mobility is not required for bedside monitor 610. Monitor 610 includes a mobility profile, and the mobility profile indicates the "No Active Mobility" setting for the device. This is because monitor 610 stays active, is not expected to move, and remains connected to the network when monitoring a patient. At other times when monitor 610 is idle, no network initiated connectivity is required. Hence the mobility profile indicates that monitor 610 should use the "No Idle Mobility" setting. A network diagram according to the proposed mobility management scheme is illustrated in FIG. 6.

The process for handling monitor 610 is as follows. First, monitor 610 establishes a signaling connection with a detected base station 622 and sends a connection request that includes a mobility profile with settings for "No Idle Mobility" and "No Active Mobility." Second, a wireless management component (Layer 1, Layer 2, Radio Resource Control (RRC), etc.) of base station 622 sends the request to wireless network module 674 of network control element 670. A connection to monitor 610 is then established (including authentication processes for monitor 610). This involves exchanging information with network functions 680, including mobility management function 681 and security function 682.

In a third step, mobility management function 681, upon analyzing the connection request, grants the mobility requested and instructs network control element 670 in executing "No Active Mobility" procedures for monitor 610. The mobility management function 681 also executes "No Idle Mobility" by not storing idle mobility state information. A fourth step includes SDN module 678 configuring/programming a Layer 3 switch in base station 622 with required information to establish layer 3 connections for the device. This includes IP address assignment rules, setting up the flow table for packet forwarding, and setting up flow metering for performing accounting. Base station 622 then performs the necessary tasks to allow packet flow between monitor 610 and health care network 660.

In a fifth step, packets flow between monitor 610 and an application of health care network 660 through aggregation router 630 and provider edge service router 650. Measurement reports periodically sent from monitor 610 may indicate to base station 622 that because of changing radio conditions, a new base station 624 is preferred. This initiates a sixth step of air-interface handoff signaling between original base station 622 and new base station 624. The handoff signaling confirms that there are sufficient resources in new base station 624, and also forwards any untransmitted air-interface packets to new base station 624. This step also includes signaling to inform the device to handover.

In a seventh step, after handover processes initiate, monitor 610 starts to send packets to new base station 624 with the IP addressed assigned by original base station 622. A switching component of base station 624 recognizes a new flow and sends a query to the network control element 670 for instructions to handle the flow in an eighth step.

In a ninth step, SDN control module 678 in network control element 670 determines that it is utilizing a "No Active Mobility" policy for the flow in its policy base as result of the instruction received from mobility management function 681 received in step three. Hence network control element 670 sends instructions to base station 624 to drop the flow and reassign a new IP address to monitor 610 from the subnet of base station 624. This is done so that new incoming packets are routed directly to base station 624.

In a tenth step, upon setting up a new connection, packets start flowing through the new base station. Monitor 610 then establishes a new Transmission Control Protocol (TCP) connection to the network side application with the new IP address.

Smart Phone Transitioning from "No Active Mobility" to "High Active Mobility"

Figure 7:
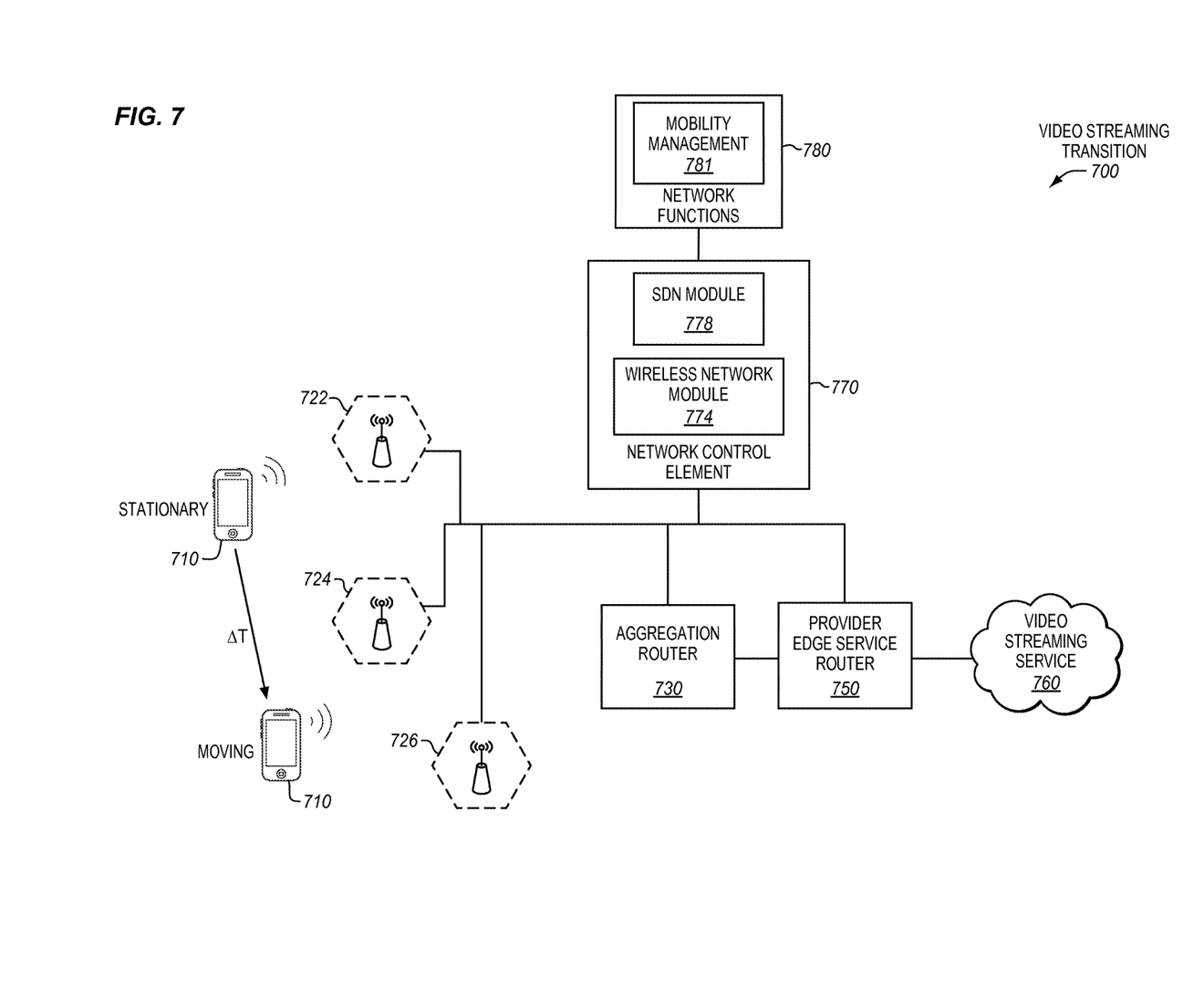
FIG. 7 is a block diagram of a telecom network that supports video streaming in an exemplary embodiment.

In the embodiment shown in block diagram 700 of FIG. 7, a user of smart phone 710 initiates an in-home connection with a video streaming service 760. Assume it is determined that behavioral patterns indicate that the user is likely to remain at home and stay attached to the same base station 722 for a long period of time. This determination may be made known to the network based on one or more of the identity of the base station 722, the time when the initial connection is requested (e.g., after working hours), and prior history stored in a profile for the user. Hence, for the initial connection a "No Active Mobility" procedure is followed. However, mobility management function 781 (of network functions 780) instructs network control element 770 to transition smart phone 710 to a "High Active Mobility" setting upon the first handover to a different base station (since this indicates that the user may be leaving the house and traveling to a new location).

The first though eighth steps are performed in the same manner as described for FIG. 6 (e.g., between elements 770, 774, 778, 730, 750, and 722, and 724 as described with regard to their corresponding elements in FIG. 6). However, in the third step, mobility management function 781 provides a rule that "No Active Mobility" should be switched to "High Active Mobility" upon first handoff event.

In a ninth step for this example, when a request comes from new base station 724, network control element 130 selects a suitable mobility anchor for the flows from smart phone 710. There are two possible options for the anchor. In a first embodiment, old base station 722 is chosen as the anchor and the SDN module 778 configures old base station 722 and new base station 724 to establish a tunnel to transfer packets on downlink and uplink. The IP address and end-to-end connection are maintained between smart phone 710 and applications on video streaming service 760. In a second embodiment, an upstream aggregation router 730 is chosen to be the anchor. In this embodiment new base station 724 is provided with flow table updates for the flows from smart phone 710 to be encapsulated in IP-in-IP tunnels towards aggregation router 730. In this case, the IP address (assigned by old base station 722) and the end-to-end connection are maintained between smart phone 710 and the applications of video streaming server 760. Although most packets are intercepted at the anchor, packets that are delivered to old base station 722 without going through the aggregation router 730 are forwarded to the anchor. Hence, in addition to selecting the anchor, old base station 722 is configured to tunnel any packets it receives for smart phone 710 to aggregation router 730.

In either case, old base station 722 retains the settings for smart phone 710, including the IP address assigned. Subsequently when the IP flow terminates for all applications using that IP address or when smart phone 710 goes idle, a new IP address and/or anchor may be assigned, and the client application on smart phone 710 will re-register with the corresponding application of video streaming service 760.

In a tenth step for this example, the new anchor is configured by network control element 770 by providing instructions to encapsulate packets sent towards the current base station and to de-encapsulate packets sent in opposite direction. The anchor is also configured by network control element 770 in order to perform metering.

With respect to this example, in an eleventh step, packets to and from smart phone 710 are tunneled between the base station and the anchor. Then in a twelfth step, as smart phone 710 continues moving, an additional handoff event is triggered. New base station 726 then queries network control element 770 to determine how to process flows from base station 724 in a thirteenth step. In a fourteenth step, network control element 770 reconfigures the tunnel end point in the anchor to new base station 726. Then, in a fifteenth step, network control element 130 provides base station 726 with the anchor address and tunneling instructions. The IP address of smart phone 710 is therefore preserved, and the flow of data continues seamlessly.

Any of the various elements shown in the figures or described herein may be implemented as hardware, software, firmware, or some combination of these. For example, an element may be implemented as dedicated hardware. Dedicated hardware elements may be referred to as "processors," "controllers," or some similar terminology. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, a network processor, application specific integrated circuit (ASIC) or other circuitry, field programmable gate array (FPGA), read only memory (ROM) for storing software, random access memory (RAM), non volatile storage, logic, or some other physical hardware component or module.

Also, an element may be implemented as instructions executable by a processor or a computer to perform the functions of the element. Some examples of instructions are software, program code, and firmware. The instructions are operational when executed by the processor to direct the processor to perform the functions of the element. The instructions may be stored on a non-transitory media or storage devices that are readable by the processor. Some examples of the storage devices are digital or solid-state memories, magnetic storage media such as a magnetic disks and magnetic tapes, hard drives, or optically readable digital data storage media.

Although specific embodiments were described herein, the scope of the invention is not limited to those specific embodiments. The scope of the invention is defined by the following claims and any equivalents thereof.

We claim:

1. A method for mobility management in a wireless network, comprising:
    for each of multiple wireless devices in a telecommunication network:
        identifying, at a telecommunication network, one of multiple mobility profiles that each include at least one active mobility setting indicating how a location of the wireless device is tracked while the wireless device is in an active state exchanging packets of data with a Packet Data Network (PDN) via the telecommunication network, and at least one idle mobility setting indicating how the location of the wireless device is tracked while the wireless device is in an idle state not exchanging packets of data with the PDN via the telecommunication network;

selecting a first active mobility setting and a first idle mobility setting from the mobility profile;

determining, based on the first active mobility setting, a first set of instructions for a first one or more network elements to engage in mobility management for the wireless device while the wireless device is in the active state;

determining, based on the first idle mobility setting, a second set of instructions for a second one or more network elements to engage in mobility management for the wireless device while the wireless device is in the idle state;

providing the first set of instructions to the first one or more network elements in accordance with the first active mobility setting to track the location of the wireless device when the wireless device is in the active state; and providing the second set of instructions to the second one or more network elements in accordance with the first idle mobility setting to track the location of the wireless device when the wireless device is in the idle state, wherein different mobility profiles are identified for each of the multiple wireless devices, and the different mobility profiles include at least one of a different idle mobility setting and a different active mobility setting that causes network elements to use different techniques to track each of the multiple wireless devices even when different ones of the multiple devices are in the same state.

2. The method of claim 1, wherein:
selecting the first active mobility setting and the first idle mobility setting from the mobility profile is based on a device type of the wireless device or an application identifier of an application on the wireless device.

3. The method of claim 1, wherein:
the mobility profile includes a plurality of active mobility settings with respective ones of the plurality of active mobility settings corresponding with respective applications of the wireless device, wherein selecting the first active mobility setting comprises selecting as the first active mobility setting a one of the plurality of active mobility settings that corresponds with a first application; and wherein providing the first set of instructions to the first one or more network elements of the telecommunication network is based on the first active mobility setting for the first application.

4. The method of claim 1, further comprising:
determining a change in state of the wireless device to the active state or the idle state;

providing a set of instructions to a set of network elements in accordance with the first active mobility setting when the change is to the active state; and providing a set of instructions to a set of network elements in accordance with the first idle mobility setting when the change is to the idle state.

5. The method of claim 1, wherein:
selecting the first active mobility setting is based on context information selected from the group consisting of: an operator policy that is defined for the telecommunication network and associated with the wireless device, subscriber analytics for the telecommunication network that indicate the behavior of the wireless device, and network analytics for the telecommunication network that indicate a level of traffic at the telecommunication network.

6. The method of claim 1, wherein:
the mobility profile is identified in a connection request received from the wireless device.

7. The method of claim 1, wherein:
the first idle mobility setting indicates that a location of the wireless device should not be tracked by the telecommunication network while the wireless device is not transmitting data.

8. The method of claim 1, wherein:
the first active mobility setting indicates that the telecommunication network set up a tunnel to provide Internet Protocol (IP) session continuity when the wireless device moves to a new base station while exchanging packets of data with the PDN.

9. The method of claim 8, wherein:
the first active mobility setting indicates that the tunnel cover a limited geographic area of the telecommunication network.

10. The method of claim 1, wherein:
the first active mobility setting indicates that the telecommunication network not set up a tunnel to provide Internet Protocol (IP) session continuity when the wireless device moves to a new base station while exchanging packets of data with the PDN.

11. The method of claim 1, wherein:
the first idle mobility setting indicates whether to retain, while the UE is not exchanging packets with the PDN, an Internet Protocol (IP) address for the wireless device that was assigned while the wireless device was exchanging packets of data with the PDN.

12. The method of claim 1, wherein:
programming the telecommunication network based on the first active mobility setting comprises:
selecting a programmable network element as an Internet Protocol (IP) anchor for the wireless device.

13. The method of claim 1, wherein:
programming the telecommunication network based on the first active mobility setting comprises:
selecting a network element to serve as a mobility anchor for the wireless device.

14. An apparatus comprising:
a network control element, comprising:
an interface configured to, for each of multiple wireless devices in a telecommunication network, obtain a connection request identifying, one of multiple mobility profiles that each include at least one active mobility setting indicating how the location of a wireless device is tracked while the wireless device is in an active state exchanging packets of data with a Packet Data Network (PDN) via the telecommunication network, and at least one idle mobility setting indicating how the location of the wireless device is tracked while the wireless device is in an idle state not exchanging packets of data with the PDN via the telecommunication network; and a controller configured to, for each of the multiple wireless devices, determine a first active mobility setting and a first idle mobility setting from the mobility profile, to determine based on the first active mobility setting a first set of instructions for a first one or more network elements to engage in mobility management for the wireless device while the wireless device is in the active state, and to determine based on the first idle mobility setting a second set of instructions for a second one or more network elements to engage in mobility management for the wireless device while the wireless device is in the idle state, wherein the controller is configured to provide the first set of instructions to the first one or more network elements in accordance with the selected active mobility setting to track the location of the wireless device if the wireless device is in the active state, and to provide the second set of instructions to the second one or more network elements in accordance with the selected idle mobility setting to track the location of the wireless device if the wireless device is in the idle state, wherein different mobility profiles are identified for each of the multiple wireless devices, and the different mobility profiles include at least one of a different idle mobility setting and a different active mobility setting that causes network elements to use different techniques to track each of the multiple wireless devices even when different ones of the multiple devices are in the same state.

15. The apparatus of claim 14, wherein:

the controller is configured to select the first active mobility setting and the first idle mobility setting from the mobility profile based on a device type of the wireless device or an application identifier of an application on the wireless device.

16. The apparatus of claim 14, wherein:

the mobility profile includes a plurality of active mobility settings with respective ones of the plurality of active mobility settings corresponding with respective applications of the wireless device, and the controller is configured to select as the first active mobility setting the respective one of the plurality of active mobility settings that corresponds to a first application, and to program the first one or more network elements of the telecommunication network based on the first active mobility setting for the first application.

17. The apparatus of claim 14, wherein:

the controller is configured to determine a change in state of the wireless device to the active state or the idle state, to provide a set of instructions to a set of network elements in accordance with the first active mobility setting when the change is to the active state, and to provide a set of instructions to a set of network elements in accordance with the first idle mobility setting when the change is to the idle state.

18. The apparatus of claim 14, wherein:

the controller is configured to select the first active mobility setting based on context information selected from the group consisting of: an operator policy that is defined for the telecommunication network and associated with the wireless device, subscriber analytics for the telecommunication network that indicate the behavior of the wireless device, and network analytics for the telecommunication network that indicate a level of traffic at the telecommunication network.

19. The apparatus of claim 14, wherein:

the mobility profile is identified in a connection request received at the interface from the wireless device.

20. A non-transitory computer readable medium embodying programmed instructions which, when executed by a processor, are operable for performing a method comprising:

for each of multiple wireless devices in a telecommunication network:

identifying, at a telecommunication network, one of multiple mobility profiles that each include at least one active mobility setting indicating how a location of the wireless device is tracked while the wireless device is in an active state exchanging packets of data with a Packet Data Network (PDN) via the telecommunication network, and at least one idle mobility setting indicating how the location of the wireless device is tracked while the wireless device is in an idle state not exchanging packets of data with the PDN via the telecommunication network;

selecting a first active mobility setting and a first idle mobility setting from the mobility profile;

determining, based on the first active mobility setting, a first set of instructions for a first one or more network elements to engage in mobility management for the wireless device while the wireless device is in the active state;

determining, based on the first idle mobility setting, a second set of instructions for a second one or more network elements to engage in mobility management for the wireless device while the wireless device is in the idle state;

providing the first set of instructions to the first one or more network elements in accordance with the first active mobility setting to track the location of the wireless device when the wireless device is in the active; and providing the second set of instructions to the second one or more network elements in accordance with the first idle mobility setting to track the location of the wireless device when the wireless device is in the idle state, wherein different mobility profiles are identified for each of the multiple wireless devices, and the different mobility profiles include at least one of a different idle mobility setting and a different active mobility setting that causes network elements to use different techniques to track each of the multiple wireless devices even when different ones of the multiple devices are in the same state.

* * * * *